Patented Feb. 3, 1942

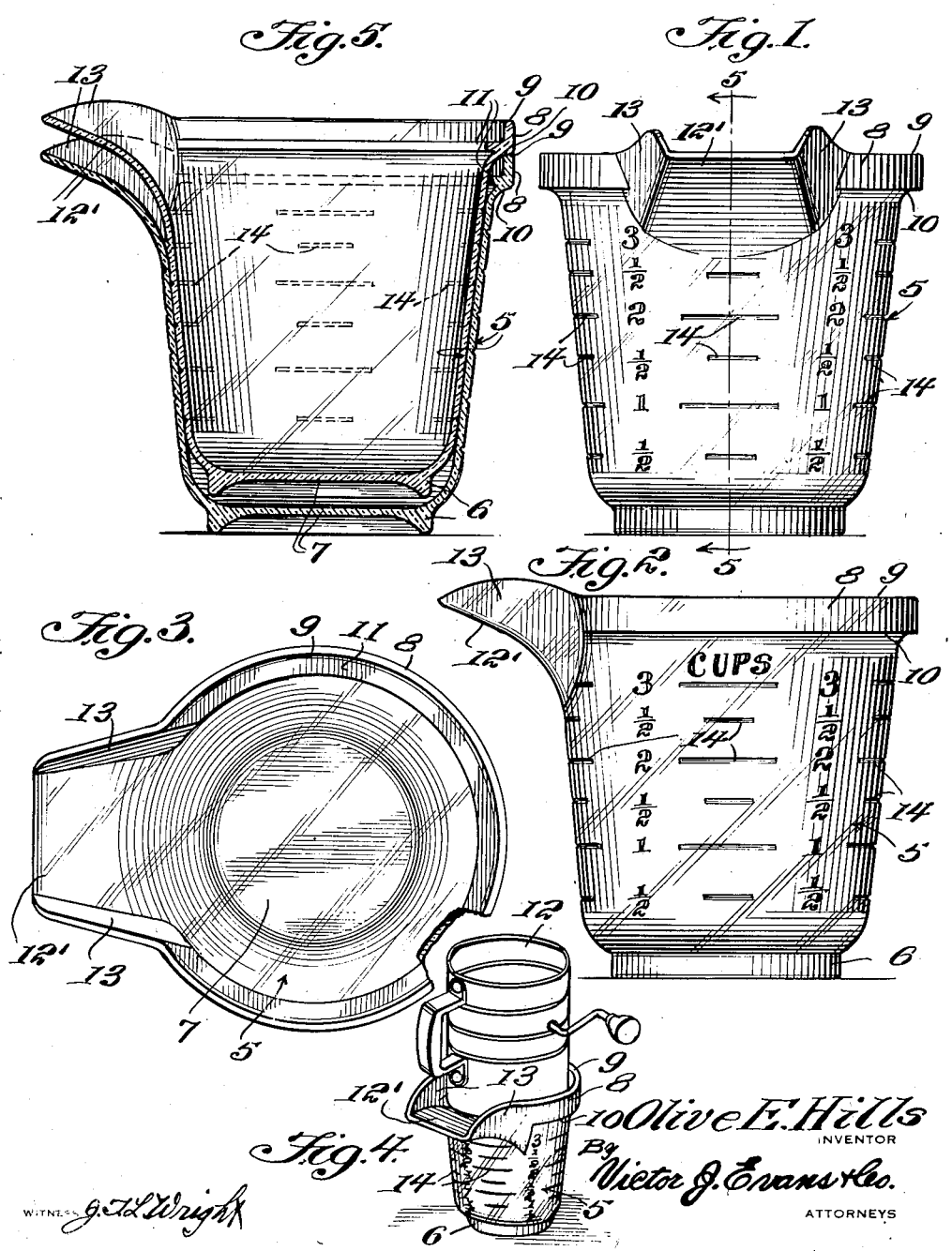

2,271,822

UNITED STATES PATENT OFFICE 2,271,822

BOWL

Olive E. Hills, Pampa, Tex.

Application February 19, 1940, Serial No. 319,761

1 Claim. (Cl. 65—13)

My invention relates to measuring containers and more particularly to measuring containers of the bowl type.

One of the principal objects of my invention is to provide a measuring bowl so constructed and arranged whereby a flour sifter or the like may be positioned thereon for sifting flour into a bowl, the latter being equipped with means for indicating the amount of flour sifted into said bowl.

Another object of my invention is to provide a bowl of the above described character so constructed and arranged whereby a similar bowl may be nested therein.

A further object of my invention is to provide a bowl of the above described character which is simple in construction, efficient in use and economical in manufacture.

Other objects and advantages will be apparent from the following description, appended claim and annexed drawing.

Referring to the drawing wherein like reference characters designate like parts throughout the several views:

Figure 1 is a front elevation of a bowl constructed in accordance with my invention.

Figure 2 is a side elevation thereof.

Figure 3 is a top plan view of my novel form of bowl.

Figure 4 is a perspective view of the bowl illustrating a flour sifter supported thereby for sifting flour into the bowl.

Figure 5 is a sectional view of my bowl taken on the line 5—5 of Figure 1 and illustrating a like bowl nested therein.

In practicing my invention, as illustrated in the drawing, I provide a bowl 5 constructed of a suitable transparent material, for instance glass or the like. The bowl 5 is of a substantial inverted frustum-shaped configuration and formed with a cylindrical-shaped subjacent flange 6 on the bottom wall 7 of the bowl, said flange constituting a supporting base. The upper end of the bowl 15 is outwardly flared and defines a circumferentially extending rim 8, the latter having upper and lower faces 9 and 10 respectively. The upper face of the bowl depicted in Figures 1 to 4 inclusive of the drawing serves to supportingly engage the lower face 10 of a similar bowl nested therein as clearly illustrated in Figure 5 of the drawing. The inner circumferential face of the rim 8 is formed with an inwardly and circumferentially extending flange 11 constituting a seat for the lower end of a flour sifter 12 as illustrated in Figure 4 of the drawing. The top section of the bowl on one side thereof is formed with a spout 12, the latter having a relatively wide mouth, the sides of which are defined by spaced walls 13, the latter being partial continuations of the rim 8.

The bowl 5 between its top and bottom is graduated into scale markings 14 indicative of teacups and fractions thereof. However, it is to be distinctly understood that the graduations may be so arranged for indicating other measurements if desired.

In use, especially in instances where it is desirable to sift the flour several times for use, as in cake or bread baking, a pair of the bowls is utilized, one being separated from the other. The flour sifter is positioned on one of the bowls as illustrated in Figure 4 of the drawing and a desired quantity of flour sifted in said bowl, the quantity being determined through the medium of the graduations 14. When flour has thus been sifted into one of the bowls the sifter is removed therefrom and positioned on the other bowl and the flour contained in the first bowl is then emptied into the sifter for sifting into the second bowl. This operation is repeated until the flour has been sifted the desired number of times. Upon completion of the sifting of the flour, the bowls may be assembled in nested relation as illustrated in Figure 5 of the drawing for conserving space in storing.

Without further elaboration the foregoing will so fully explain the invention that others may, by applying current knowledge, readily adapt the same for use under various conditions of service. Moreover, it is not indispensable that all the features of the invention can be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

A bowl of the character described comprising a conical body closed at the bottom reduced end and having the upper open end portion flaring outwardly, a cylindrical rim formed on the flaring top portion of the body and having a diameter enlarged relative to the diameter of the body to form an annular laterally protruding nesting shoulder at the bottom of the rim, an annular inwardly directed seat forming flange formed at the juncture of the flared top of the body and the cylindrical rim, and an outwardly directed pouring spout formed at the top of the body and the rim at one side thereof.

OLIVE E. HILLS.